(12) United States Patent
Van Engelen et al.

(10) Patent No.: US 8,133,953 B2
(45) Date of Patent: Mar. 13, 2012

(54) COATING COMPOSITION COMPRISING A POLYACRYLATE POLYOL, A POLYESTER POLYOL, AND AN ISOCYANATE-FUNCTIONAL CROSSLINKER

(75) Inventors: Antonius Hendrikus Gerardus Van Engelen, Noordwijkerhout (NL); Martinus Adrianus Anthonius Maria Koenraadt, Noordwijk (NL); Antonius Josephus Van Der Putten, Noordwijkerhout (NL)

(73) Assignee: Akzo Nobel Coatings International B.V., Arnhem (NL)

( * ) Notice: Subject to any disclaimer, the term of this patent is extended or adjusted under 35 U.S.C. 154(b) by 356 days.

(21) Appl. No.: 12/064,010

(22) PCT Filed: Aug. 16, 2006

(86) PCT No.: PCT/EP2006/065352
§ 371 (c)(1),
(2), (4) Date: Feb. 15, 2008

(87) PCT Pub. No.: WO2007/020269
PCT Pub. Date: Feb. 22, 2007

(65) Prior Publication Data
US 2008/0234410 A1   Sep. 25, 2008

Related U.S. Application Data

(60) Provisional application No. 60/712,123, filed on Aug. 30, 2005.

(30) Foreign Application Priority Data

Aug. 17, 2005   (EP) .................................. 05107563

(51) Int. Cl.
*C08G 18/06* (2006.01)
*C08F 8/30* (2006.01)
*C08K 5/37* (2006.01)
*B05D 1/00* (2006.01)

(52) U.S. Cl. ........ 525/123; 523/507; 523/514; 524/590; 528/85; 427/407.1

(58) Field of Classification Search .................. 523/507, 523/514; 524/590; 525/123; 528/85
See application file for complete search history.

(56) References Cited

U.S. PATENT DOCUMENTS

| 3,119,792 | A | 1/1964 | Schultheis et al. |
| 3,193,525 | A | 7/1965 | Kallert et al. |
| 3,897,396 | A | 7/1975 | Ishii et al. |
| 3,919,174 | A | 11/1975 | Taller |
| 4,597,811 | A | 7/1986 | Ducote |
| 4,788,083 | A | 11/1988 | Dammann et al. |
| 4,873,273 | A | 10/1989 | Allan et al. |
| 4,877,829 | A | 10/1989 | Vu et al. |
| 5,214,086 | A | 5/1993 | Mormile et al. |
| 5,290,632 | A | 3/1994 | Jadhav et al. |
| 5,663,233 | A | 9/1997 | Bederke et al. |
| 5,820,925 | A | 10/1998 | Fenn et al. |
| 5,852,120 | A | 12/1998 | Bederke et al. |
| 6,485,549 | B1 | 11/2002 | Novak et al. |
| 069,382 | A1 | 4/2003 | Huynh-Ba |
| 6,548,615 | B1 | 4/2003 | Groth et al. |
| 6,548,617 | B2 | 4/2003 | van den Berg et al. |
| 6,946,515 | B1 * | 9/2005 | Lettmann et al. ............ 524/591 |
| 2004/0091716 | A1 | 5/2004 | Van Den Berg et al. |
| 2008/0281034 | A1 | 11/2008 | Ganguli et al. |

FOREIGN PATENT DOCUMENTS

| DE | 1 805 720 | 6/1969 |
| EP | 0 276 667 | 8/1988 |
| EP | 0 448 224 | 3/1990 |
| EP | 0 448 244 | 9/1991 |
| EP | 0 454 219 | 10/1991 |
| EP | 0 688 840 | 12/1995 |
| FR | 1 346 808 | 12/1963 |
| GB | 2 188 327 | 9/1987 |
| WO | WO 93/17060 | 9/1993 |
| WO | WO 96/20968 | 7/1996 |
| WO | WO 96/40813 | 12/1996 |
| WO | WO 97/31073 | 8/1997 |
| WO | WO 98/53013 | 11/1998 |
| WO | WO 02/098942 | 12/2002 |
| WO | WO 2004/031256 | 4/2004 |
| WO | WO 2005/035613 | 4/2005 |

OTHER PUBLICATIONS

International Search Report and Written Opinion, International PCT Application No. PCT/EP2006/065352, mailed Nov. 27, 2006.
European Search Report, European Application No. EP 05 10 7563 dated Jan. 20, 1996.
International Search Report and Written Opinion, International PCT Application No. PCT/EP2006/065355, mailed Dec. 8, 2006.
European Search Report, European Application No. EP 91 20 0893 dated Aug. 1, 1991.
Database WPI Week 199101, Derwent Publications Ltd., 1991-003178, JP 02 279713, Nov. 15, 1990.

* cited by examiner

*Primary Examiner* — Tae H Yoon
(74) *Attorney, Agent, or Firm* — Kenyon & Kenyon LLP

(57) ABSTRACT

The invention relates to a coating composition comprising a) a polyacrylate polyol obtainable by polymerization of olefinically unsaturated monomers wherein at least 40 weight-% of the monomers comprises linear or branched alk(en)yl or alk(en)ylene groups having at least 4 carbon atoms; b) a polyester polyol obtainable by esterification of building blocks having ester-forming functional groups wherein at least 30 weight-% of the building blocks comprises linear or branched alk(en)yl or alk(en)ylene groups with at least 4 carbon atoms per ester-forming functional group, the polyester polyol having a hydroxy value above 280 mg KOH/g and a hydroxy functionality of at least 2, and c) an isocyanate-functional crosslinker.

19 Claims, No Drawings

COATING COMPOSITION COMPRISING A POLYACRYLATE POLYOL, A POLYESTER POLYOL, AND AN ISOCYANATE-FUNCTIONAL CROSSLINKER

REFERENCE TO RELATED APPLICATION(S)

This application claims the benefit of U.S. Provisional Application No. 60/712,123 filed on Aug. 30, 2005.

The invention relates to a coating composition comprising a polyacrylate copolymer polyol, a polyester polyol, and an isocyanate-functional crosslinker.

The invention further relates to kit of parts for preparation of the coating composition and to a method of applying the coating composition.

A coating composition of the above-mentioned type is known from international patent application WO 96/20968. This document relates to a high solids coating composition comprising a hydroxy-functional branched polyester having a hydroxy value between 80 and 280 mg KOH/g, a hydroxy-functional acrylic or methacrylic copolymer, and a crosslinking agent.

European patent application EP 0688840 A describes coating compositions comprising a hydroxy-functional polyester having a hydroxy value of 40 to 200 mg KOH/g, a hydroxy group-containing (meth)acrylate copolymer, and a crosslinking agent.

With the known coating compositions a satisfactory balance of properties cannot be achieved when a very high solids content is required. For example, increasing the proportion of hydroxy-functional branched polyester at the expense of hydroxy-functional acrylic or methacrylic copolymer in the composition of WO 96/20968 leads to a lower volatile organic content (VOC) of the composition. However, it leads to longer drying times and decreased hardness of the coatings as well, with the risk of sagging and/or dirt pick-up. Thus, a satisfactory combination of very high solids content and very short drying time cannot be achieved. Longer drying times are undesirable in view of the high throughput of coating operations. Furthermore, most known coating compositions comprising a high curing catalyst load to obtain a short drying time suffer from foam stabilization in the drying coating, leading to pinholes in the dried coating layer. Pinholes detract from the appearance and durability of coating layers.

Accordingly, the invention seeks to provide a coating composition having a satisfactory balance of properties, i.e. a low content of volatile organic solvent at application viscosity, a fast drying speed, leading to coatings with good appearance properties, in particular a low susceptibility to pinholes, and good hardness. In addition, the coating composition should also provide cured coatings exhibiting other properties required for motor vehicle exterior finishes, such as flexibility, scratch resistance, gloss, durability, and resistance to chemicals and UV radiation.

The invention now provides a coating composition comprising
  a) a polyacrylate polyol obtainable by polymerization of olefinically unsaturated monomers wherein at least 40 weight-% of the monomers comprises linear or branched alk(en)yl or alk(en)ylene groups having at least 4 carbon atoms;
  b) a polyester polyol obtainable by esterification of building blocks having ester-forming functional groups wherein at least 30 weight-% of the building blocks comprises linear or branched alk(en)yl or alk(en)ylene groups with at least 4 carbon atoms per ester-forming functional group, the polyester polyol having a hydroxy value above 280 mg KOH/g and a hydroxy functionality of at least 2, and
  c) an isocyanate-functional crosslinker.

The coating composition of the invention provides a satisfactory balance of low content of volatile organic solvent at application viscosity, fast drying speed, low susceptibility to foam stabilization in the drying coating, and having good appearance properties, in particular a low susceptibility to pinholes. In addition, the coating composition also provides cured coatings exhibiting other properties required for motor vehicle exterior finishes, such as good hardness and scratch resistance, gloss, durability, and resistance to chemicals and UV radiation.

It should be noted that WO 2002/098942 exemplifies coating compositions without a polyacrylate polyol comprising a polyester polyol having a hydroxy value in the range of 200 to 400 mg KOH/g.

The coating composition of the invention comprises a polyacrylate polyol wherein at least 40 weight-% of the monomers, based on the total weight of the monomers of the polyacrylate polyol, comprises linear or branched alk(en)yl or alk(en)ylene groups having at least 4 carbon atoms. The expression "alk(en)yl groups" designates alkyl groups, alkenyl groups, and/or mixtures thereof. "Alk(en)ylene groups" include alkylene groups, alkenylene groups, and/or mixtures thereof. As is usual in the art, the term polyacrylate polyol designates a polymer having a plurality of hydroxy groups obtained by (co)polymerization of acrylic and/or methacrylic monomers. Also other olefinically unsaturated polymerizable monomers may be used for the preparation of the polyacrylate polyol, such as vinyl aromatic monomers, other vinyl monomers, or allyl monomers. Hereinafter "acrylate and/or methacrylate" is referred to as "(meth)acrylate".

As mentioned above, at least 40 weight-% of the monomers of the polyacrylate polyol comprises linear or branched alk(en)yl or alk(en)ylene groups having at least 4 carbon atoms. Preferably, at least 50 weight-% of the monomers, and more preferably between 55 and 80 weight-% of the monomers, based on the total weight of the monomers of the polyacrylate polyol, comprises linear or branched alk(en)yl or alk(en)ylene groups having at least 4 carbon atoms. The alk(en)yl or alk(en)ylene groups having at least 4 carbon atoms may be linear or branched. Cyclic alk(en)yl or alk(en)ylene groups do not provide the above-described advantages. Examples of suitable monomers comprising linear or branched alk(en)yl or alk(en)ylene groups having at least 4 carbon atoms are esters of (meth)acrylic acid with linear or branched alcohols having at least 4 carbon atoms. Examples of such monomers are n-butyl(meth)acrylate, iso-butyl (meth)acrylate, tert.-butyl(meth)acrylate, linear or branched pentyl, hexyl, heptyl, octyl or higher (meth)acrylates. Also alk(en)yl-substituted cycloaliphatic or vinylaromatic monomers may be used, provided that these comprise linear or branched alk(en)yl or alk(en)ylene groups having at least 4 carbon atoms. Examples are tert.-butylcyclohexyl (meth)acrylate or tert.-butyl styrene. Also vinyl esters are suitable, for example vinyl decanoate or vinyl dodecanoate. In so far as the hydroxy-functional monomers described below comprise alk(en)yl or alk(en)ylene groups having at least 4 carbon atoms, such as hydroxybutyl(meth)acrylate, they can also contribute to the proportion of monomers comprising alk(en)yl or alk(en)ylene groups having at least 4 carbon atoms.

The polyacrylate polyol has an average of at least two hydroxy-functional groups per molecule. Hydroxy-functional groups can be introduced into the polymer by hydroxy-functional monomers. Examples of suitable hydroxy-functional monomers are hydroxyalkyl esters of mono- or di-ethylenically unsaturated carboxylic acids. The alkyl group of the hydroxyalkyl esters may suitably have 1 to 12 carbon atoms. Specific examples of suitable hydroxy-functional monomers are 2-hydroxyethyl(meth)acrylate, 2- and 3-hydroxypropyl(meth)acrylate, 2-, 3-, and 4-hydroxybutyl (meth)acrylate, and mixtures thereof. Further examples are the reaction product of (meth)acrylic acid, itaconic acid, maleic acid or fumaric acid with monoepoxy compounds such as ethylene oxide, glycidyl ethers, glycidyl esters such as Cardura E10, and the like. A hydroxy functionality may also be obtained from monomer precursors. For example, the epoxy group of a glycidyl methacrylate unit in the polymer may be converted to hydroxy functionality in a post polymerization reaction by reaction with water or a carboxylic acid.

The balance of the polyacrylate polyol comprises other ethylenically unsaturated polymerizable monomers, such as (meth)acrylic and/or vinyl monomers. As examples thereof styrene, methyl styrene, vinyl toluene, (meth)acrylic acid, methyl(meth)acrylate, ethyl(meth)acrylate, propyl(meth) acrylate, acrylic amide, and vinyl acetate may be mentioned. Also (meth)acrylates of cyclic alcohols, such as cyclohexyl (meth)acrylate or isobornyl(meth)acrylate may be used. The polyacrylate polyol can also contain minor amounts up to about 10% of polymerized units of polyunsaturated monomers such as allyl methacrylate, ethylene glycol dimethacrylate, hexane diol diacrylate, trimethylol propane triacrylate, and the like.

The monomers for preparation of the polyacrylate polyol are suitably selected so that the theoretical glass transition temperature (Tg) of the polyacrylate, calculated according to the Fox-equation, is at least −15° C., preferably at least −5° C., more preferably at least 0° C. A suitable upper limit of the theoretical Tg is 125° C., preferably 100° C., more preferably 85° C. It should be noted that in the case of low molecular weight polyacrylate polyols the actual Tg may be significantly lower than the theoretical Tg.

The hydroxy value, based on non-volatile matter, of the polyacrylate polyol suitably is at least 60 mg KOH/g, preferably at least 85 mg KOH/g, and more preferably at least 120 mg KOH/g. A suitable upper limit of the hydroxy value is 200 mg KOH/g, preferably 180 mg KOH/g, and more preferably 170 mg KOH/g.

The number average molecular weight (Mn) of the polyacrylate polyol suitably is at least 800, preferably at least 1,200, and more preferably at least 1,500. A suitable upper limit of the Mn is 10,000, preferably 7,000, and more preferably 5,000. The polydispersity (Mw/Mn) of the polyacrylate polyol suitably is below 3.2, preferably below 2.8, and more preferably below 2.5.

The acid value, based on non-volatile matter, of the polyacrylate polyol is not a particularly critical parameter. It suitably is at least 3 mg KOH/g, preferably 5 mg KOH/g, and more preferably 7 mg KOH/g. A suitable upper limit of the acid value is 30 mg KOH/g, preferably 25 mg KOH/g, and more preferably 20 mg KOH/g.

The polyacrylate polyol may suitably be prepared by the well-known free-radical polymerization of the above-mentioned olefinically unsaturated polymerizable monomers. The polymerization can be carried out in one or more stages and in the absence or presence of an organic diluent. If an organic diluent is used, it is preferable to use a volatile diluent which comprises alk(en)yl or alk(en)ylene groups having at least 4 carbon atoms. Examples of such diluents are described below.

Suitable radical-forming initiators are known in the art, such as di-tert.-butyl peroxide, tert.-butyl peroxy benzoate, tert.-butyl peroxy-2-ethyl hexanoate, tert.-butyl peroxy-3,5, 5-trimethyl hexanoate, and the like, and azo initiators such as 2,2'-azo-bis(2-methylbutyronitrile) and 2,2'-azo-bis(isobutyronitrile).

The molecular weight of the polymers can be controlled by the ratio of monomers to initiators and by chain transfer agents. Examples of suitable chain transfer agents include n-octyl mercaptan, n-dodecyl mercaptan, tert.-dodecyl mercaptan, mercaptoethanol, mercaptopropionic acid, and thioglycol.

Advanced polymerization techniques, such as group transfer polymerization (GTP), atom transfer radical polymerization (ATRP), and reversible addition fragmentation chain transfer (RAFT) polymerization, can also be used for the preparation of the polyacrylate polyol.

The coating composition of the invention also comprises a polyester polyol obtainable by esterification of building blocks having ester-forming functional groups wherein at least 30 weight-% of the building blocks have linear or branched alk(en)yl or alk(en)ylene groups with at least 4 carbon atoms per ester-forming functional group, preferably at least 5, more preferably at least 6 carbon atoms per ester-forming functional group, the polyester polyol having a hydroxy value above 280 mg KOH/g and a hydroxy functionality of at least 2. As mentioned above, said alk(en)yl or alk(en)ylene groups with at least 4 carbon atoms per ester-forming functional group must be linear or branched. Cyclic alk(en)yl or alk(en)ylene groups do not provide the above-described advantages.

The polyester polyol can be prepared by known condensation and/or addition reactions of building blocks having ester-forming functional groups. Examples of ester-forming functional groups are carboxylic acid groups, (cyclic) carboxylic anhydride groups, carboxylic ester groups, hydroxy groups, epoxide groups, oxetane groups, and lactone groups. In order to form a polyester, at least a part of the building blocks used must have a functionality of at least 2. However, mono-functional and tri- or higher functional building blocks can be used as well.

It is essential that at least 30 weight-% of the polyester building blocks has linear or branched alk(en)yl or alk(en) ylene groups with at least 4, preferably at least 5 carbon atoms per ester-forming functional group.

Examples of suitable polyester building blocks are monocarboxylic acids having an alk(en)yl or alk(en)ylene group with at least 4 carbon atoms linked to the carboxylic acid group, such as pentanoic acid, hexanoic acid, heptanoic acid, octanoic acid, iso-octanoic acid, nonanoic acid, iso-nonanoic acid, decanoic acid or isomers thereof, such as versatic acid, higher fatty acids having 12 to 22 carbon atoms, and mixtures thereof. A commercially available mixture of fatty acids having 8 and 10 carbon atoms may be specifically mentioned. Such a mixture is available from Cognis under the trade designation Edenor V85.

Also suitable are dicarboxylic acids such as sebacic acid, dodecanedioic acid, octenyl succinic acid, dodecenyl succinic acid (any isomer or mixture of isomers), as well as dimer fatty acids. Examples of carboxylic anhydrides having linear or branched alk(en)yl or alk(en)ylene groups with at least 4 carbon atoms per ester-forming functional group are decanoic anhydride, dodecanoic anhydride, dodecyl succinic anhydride, and dodecenyl succinic anhydride.

Hydroxy carboxylic acids and the derived lactones, such as gamma-decanolactone, can also be used, provided that they have linear or branched alk(en)yl or alk(en)ylene groups with at least 4 carbon atoms per ester-forming functional group. It should be noted that hydroxy carboxylic acids as well as the derived lactones have 2 ester-forming functional groups.

Examples of suitable monoalcohols are butanol, pentanol, hexanol, heptanol, and octanol. It is also possible to use longer chain monoalcohols wherein the alk(en)yl or alk(en)ylene group is derived from a fatty acid, i.e. fatty alcohols. Suitable diols include 2-butyl-2-ethyl-1,3-propane diol, 2,2,4-trimethyl-1,3-pentane diol, 1,8-octane diol, 1,10-decane diol, and isomers thereof.

An epoxide group is capable of forming two ester groups. Therefore, an epoxide-functional building block requires linear or branched alk(en)yl or alk(en)ylene groups with at least 8 carbon atoms. Examples thereof are epoxidized olefins, glycidyl ethers of fatty alcohols, and glycidyl esters of fatty acids. The glycidyl ester of versatic acid may be specifically mentioned.

In addition to the building blocks described above having linear or branched alk(en)yl or alk(en)ylene groups with at least 4 carbon atoms per ester-forming functional group, other ester-forming building blocks may be used for preparation of the polyester polyol, provided that these are used in an amount of less than 70 weight-%, calculated on the total weight of the building blocks.

Examples of cycloaliphatic polyols include 1,4-cyclohexane dimethanol, 1,4-cyclohexane diol, 2,2-bis(4-hydroxycyclohexyl)propane, bis-hydroxymethyltricyclo-decane, and mixtures thereof. Examples of aliphatic polyols include glycerol, 1,2-propane diol, 1,3-propane diol, 2-methyl-1,3-propane diol, neopentyl glycol, 1,6-hexane diol, trimethylol ethane, trimethylol propane, 1,2,6-hexane triol, pentaerythritol, ditrimethylol propane, propoxylated pentaerythritol, ethoxylated trimethylol propane, dimethylol propionic acid, and mixtures thereof.

Preferred diols include 1,2-ethane diol, 1,2-propane diol, 1,3-propane diol, 3-methyl-1,3-propane diol, 2-butyl-2-ethyl-1,3-propane diol, dimethylol propionic acid, and 1,4-cyclohexane dimethanol.

Suitable cyclic polycarboxylic acids include aromatic polycarboxylic acids and cycloaliphatic polycarboxylic acids. Examples of aromatic polycarboxylic acids include isophthalic acid, phthalic acid, trimellitic acid, and mixtures thereof. Also included are the esters or the anhydrides thereof, such as phthalic anhydride, trimellitic anhydride, and mixtures thereof. Examples of cycloaliphatic poly-carboxylic acids include 1,2-cyclohexane dicarboxylic acid, 1,3-cyclohexane dicarboxylic acid, tetrahydrophthalic acid, endomethylene tetrahydrophthalic acid, hexahydrophthalic acid, methyl hexahydrophthalic acid, and mixtures thereof. Also included are the esters or the anhydrides thereof, such as tetrahydrophthalic anhydride, endomethylene tetrahydrophthalic anhydride, hexahydrophthalic anhydride, methyl hexahydrophthalic anhydride, and mixtures thereof.

Examples of acyclic polycarboxylic acids include malonic acid, succinic acid, glutaric acid, adipic acid, azelaic acid, and mixtures thereof. Also included are the esters or the anhydrides thereof, such as the dimethyl ester and the diethyl ester of malonic acid, succinic anhydride, and mixtures thereof.

As mentioned above, the hydroxy value of the polyester polyol is above 280 mg KOH/g and the hydroxy functionality is at least 2. In order to obtain the desired hydroxy value and hydroxy functionality, an excess of hydroxy-functional building blocks is suitably employed in the preparation of the polyester polyol. It is also preferred that the polyester polyol is a branched or dendrimeric polyester. Branching is obtained by building blocks having 3 or more ester-forming functional groups per molecule.

A suitable upper limit of the hydroxy value is 380 mg KOH/h, preferably 350 mg KOH/g. Preferably, the hydroxy functionality is in the range of 2 to 4, more preferably 2 to 3.5.

The acid value of the polyester polyol is not a particularly critical parameter, but generally is below 25 mg KOH/g. Typically, the acid value of the polyester polyol is below 15 mg KOH/g.

In order to obtain a low content of volatile organic diluent in the coating composition at application viscosity, the polyester polyol suitably has a number average molecular weight Mn of less than 4,000, preferably less than 2,000, more preferably less than 1,600, most preferably between 500 and 1,200. The polydispersity (Mw/Mn) of the polyester polyol suitably is below 2.5, preferably below 2, and more preferably below 1.7.

Without wishing to be bound by any theory, it is believed that the particular monomers comprising linear or branched alk(en)yl or alk(en)ylene groups having at least 4 carbon atoms in the polyacrylate polyol in combination with the polyester building blocks having linear or branched alk(en)yl or alk(en)ylene groups with at least 4 carbon atoms per ester-forming functional group provide a coating composition having a surface tension in a specific range. It is further believed that this specific surface tension range leads to the decreased sensitivity of the coating compositions of the invention to the formation of pinholes in the dried coating.

Suitable isocyanate-functional crosslinkers for use in the coating composition are isocyanate-functional compounds comprising at least two isocyanate groups. Preferably, the isocyanate-functional crosslinker is a polyisocyanate, such as an aliphatic, cycloaliphatic or aromatic di-, tri- or tetra-isocyanate. Examples of diisocyanates include 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, dodecamethylene diisocyanate, ω,ω'-dipropylether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexyl methane-4,4'-diisocyanate (Desmodur® W), toluene diisocyanate, 1,3-bis(isocyanatomethyl)benzene, xylylene diisocyanate, α,α,α',α'-tetramethyl xylylene diisocyanate (TMXDI®), 1,5-dimethyl-2,4-bis(2-isocyanatoethyl) benzene, 1,3,5-triethyl-2,4-bis(isocyanato-methyl)benzene, 4,4'-diisocyanato-diphenyl, 3,3'-dichloro-4,4'-diisocyanato-diphenyl, 3,3'-diphenyl-4,4'-diisocyanato-diphenyl, 3,3'-dimethoxy-4,4'-diisocyanato-diphenyl, 4,4'-diisocyanato-diphenyl methane, 3,3'-dimethyl-4,4'-diisocyanato-diphenylmethane, and diisocyanatonaphthalene. Examples of triisocyanates include 1,3,5-triisocyanatobenzene, 2,4,6-triisocyanatotoluene, 1,8-diisocyanato-4-(isocyanatomethyl) octane, and lysine triisocyanate. Adducts and oligomers of polyisocyanates, for instance biurets, isocyanurates, allophanates, uretdiones, urethanes, and mixtures thereof are also included. Examples of such oligomers and adducts are the adduct of 2 molecules of a diisocyanate, for example hexamethylene diisocyanate or isophorone diisocyanate, to a diol such as ethylene glycol, the adduct of 3 molecules of hexamethylene diisocyanate to 1 molecule of water (available under the trademark Desmodur N of Bayer), the adduct of 1 molecule of trimethylol propane to 3 molecules of toluene diisocyanate (available under the trademark Desmodur L of Bayer), the adduct of 1 molecule of trimethylol propane to 3 molecules of isophorone diisocyanate, the adduct of 1 molecule of pentaerythritol to 4 molecules of toluene diisocyanate, the adduct of 3 moles of m-α,α,α',α'-tetramethyl xylene diisocyanate to 1 mole of trimethylol propane, the isocyanurate trimer of 1,6-diisocyanatohexane, the isocyanurate trimer of isophorone diisocyanate, the uretdion dimer of 1,6-diisocyanatohexane, the biuret of 1,6-diisocyanatohexane, the allophanate of 1,6-diisocyanatohexane, and mixtures thereof. Furthermore, (co)polymers of isocyanate-functional monomers such as α,α'-dimethyl-m-isopropenyl benzyl isocyanate are suitable for use.

The coating composition may be used and applied without a volatile diluent, in particular when low molecular weight binders, optionally in combination with one or more reactive diluents, are used. Alternatively, the coating composition may optionally comprise a volatile diluent. Preferably, the coating composition comprises less than 500 g/l of volatile organic solvent based on the total composition, more preferably less than 480 g/l, and most preferably 420 g/l or less. The non-volatile content of the composition, usually referred to as the solid content, preferably is higher than 50 weight-% based on the total composition, more preferably higher than 54 weight-%, and most preferably higher than 60 weight-%.

Examples of suitable volatile organic diluents are hydrocarbons, such as toluene, xylene, Solvesso 100, ketones, terpenes, such as dipentene or pine oil, halogenated hydrocarbons, such as dichloromethane, ethers, such as ethylene glycol dimethyl ether, esters, such as ethyl acetate, ethyl propionate, or ether esters, such as methoxypropyl acetate or ethoxyethyl propionate. Also mixtures of these compounds can be used.

It is preferred that the diluent comprises alk(en)yl or alk(en)ylene groups having at least 4 carbon atoms. Preferably at least 60 weight-% of the volatile diluent, more preferably 80 weight-%, and most preferably above 90 weight-% comprises alk(en)yl or alk(en)ylene groups having at least 4 carbon atoms. Examples of volatile diluents comprising alk(en)yl or alk(en)ylene groups having at least 4 carbon atoms are esters, such as n-butyl formate, n-butyl acetate, n-butyl propionate, n-butyl butyrate, the corresponding tert.-butyl, sec.-butyl, and iso-butyl esters, esters of linear or branched pentanol, hexanol, or octanol, such as 2-ethyl-hexanol, ketones, such as methyl amyl ketone or methyl iso-amyl ketone, aliphatic hydrocarbons having more than 4 carbon atoms, aromatic hydrocarbons having substituents comprising alk(en)yl or alk(en)ylene groups having at least 4 carbon atoms, ethers, such as dibutyl ether, dipentyl ether, dioctyl ether, and alcohols, such as linear or branched butanol, pentanol, hexanol, and octanol. The alcohols are less preferred as volatile diluents due to their reactivity with isocyanate-functional crosslinkers.

If so desired, it is possible to include one or more so-called "exempt solvents" in the coating composition. An exempt solvent is a volatile organic compound that does not participate in an atmospheric photochemical reaction to form smog. It can be an organic solvent, but it takes so long to react with nitrogen oxides in the presence of sunlight that the Environmental Protection Agency of the United States of America considers its reactivity to be negligible. Examples of exempt solvents that are approved for use in paints and coatings include acetone, methyl acetate, parachlorobenzotrifluoride (commercially available under the name Oxsol 100), and volatile methyl siloxanes. Also tertiary butyl acetate is being considered as an exempt solvent.

In addition to the components described above, other compounds can be present in the coating composition according to the present invention. Such compounds may be main binders and/or reactive diluents, optionally comprising reactive groups which may be cross-linked with the aforesaid hydroxy-functional compounds and/or isocyanate-functional crosslinkers. Examples include hydroxy-functional binders, e.g. polyether polyols, polyacrylate polyols, polyurethane polyols, cellulose acetobutyrate, hydroxy-functional epoxy resins, alkyds, and dendrimeric polyols such as described in International patent application WO 93/17060. Also, hydroxy-functional oligomers and monomers, such as castor oil, trimethylol propane, and diols may be present. Branched diols such as described in WO 98/053013, e.g. 2-butyl-ethyl-1,3-propanediol, may be particularly mentioned. The coating composition can also comprise latent hydroxy-functional compounds such as compounds comprising bicyclic orthoester, spiro-orthoester, or spiro-ortho silicate groups. These compounds and their use are described in WO 97/31073 and WO 2004/031256.

Finally, ketone resins, aspargyl acid esters, and latent or non-latent amino-functional compounds such as oxazolidines, ketimines, aldimines, diimines, secondary amines, and polyamines can be present. These and other compounds are known to the skilled person and are mentioned, int. al., in U.S. Pat. No. 5,214,086.

The coating composition may further comprise other ingredients, additives or auxiliaries commonly used in coating compositions, such as pigments, dyes, surfactants, pigment dispersion aids, levelling agents, wetting agents, anti-cratering agents, antifoaming agents, antisagging agents, heat stabilizers, light stabilizers, UV absorbers, antioxidants, and fillers.

In a preferred embodiment the coating composition of the invention also comprises a curing catalyst for catalysis of the curing reaction between hydroxy groups and isocyanate groups. Such catalysts are known to the skilled person. The catalyst is generally used in an amount of 0 to 10 weight-%, preferably 0.001 to 5 weight-%, more preferably in an amount of 0.01 to 1 weight-%, calculated on the non-volatile matter of the coating composition. Suitable catalysts include basic catalysts, such as tertiary amines, and metal based catalysts. Suitable metals include zinc, cobalt, manganese, zirconium, bismuth, and tin. It is preferred that the coating composition comprises a tin based catalyst. Well-known examples of tin based catalysts are dimethyl tin dilaurate, dimethyl tin diversatate, dimethyl tin dioleate, dibutyl tin dilaurate, dioctyl tin dilaurate, and tin octoate.

It is also preferred that the coating composition additionally comprises a pot life extending agent. Pot life extending agents increase the pot life of the coating composition, i.e. the time between mixing of all components and the moment the viscosity becomes too high for the composition to be applied. Pot life extending agents can suitably be present in similar amounts as the curing catalysts mentioned above. Preferred pot life extending agents have only a limited or no negative impact on the drying speed of the coating composition. Thus, these pot life extending agents improve the balance of pot life and drying speed. Examples of suitable pot life extending agents are carboxylic acid group-containing compounds, such as acetic acid, propionic acid or pentanoic acid. Aromatic carboxylic acid group-containing compounds are preferred, in particular benzoic acid.

Other suitable pot life extending agents are dicarbonyl compounds, such as 2,4-pentanedione, phenolic compounds, tertiary alcohols such as tertiary butanol and tertiary amyl alcohol, and thiol group-containing compounds.

It is also possible to use a combination of the above-mentioned pot life extending agents, such as a combination of an aromatic carboxylic acid group-containing compound and a thiol group-containing compound.

The weight ratio of polyacrylate polyol to polyester polyol in the coating composition, based on non-volatile matter, suitably is between 95:5 and 40:60, preferably between 90:10 and 50:50, more preferably between 80:20 and 60:40.

In the coating composition according to the invention the equivalent ratio of isocyanate-functional groups to isocyanate reactive groups, usually hydroxy groups, preferably is between 0.5 and 4.0, more preferably between 0.7 and 2.5, and most preferably between 0.8 and 1.2. Generally, the weight ratio of hydroxy-functional binders to isocyanate-functional crosslinker in the coating composition, based on non-volatile content, is between 85:15 and 55:45, preferably between 75:25 and 65:35. It is particularly preferred that the coating composition comprises at least 30 weight-% of isocyanate-functional crosslinker, based on the non-volatile material of the coating composition.

As usual with coating compositions comprising a hydroxy-functional binder and an isocyanate-functional crosslinker, the composition according to the invention has a limited pot life. Therefore, the composition is suitably provided as a multi-component composition, for example as a two-component composition or as a three-component composition. Therefore, the invention also relates to a kit of parts for preparation of the coating composition comprising (i) a binder component comprising a polyacrylate polyol obtainable by polymerization of olefinically unsaturated monomers wherein at least 40 weight-% of the monomers comprises linear or branched alk(en)yl or alk(en)ylene groups having at least 4 carbon atoms, and a polyester polyol obtainable by esterification of building blocks having ester-forming functional groups wherein at least 30 weight-% of the building blocks comprises linear or branched alk(en)yl or alk(en)ylene groups with at least 4 carbon atoms per ester-forming functional group, the polyester polyol having a hydroxy value above 280 mg KOH/g and a hydroxy functionality of at least 2, and (ii) a crosslinker component comprising an isocyanate-functional crosslinker.

In a preferred embodiment the binder component additionally comprises a curing catalyst as described above. If the coating composition also comprises a pot life extending agent, it is preferred that the pot life extending agent is comprised in the binder component or in an optional reducer component.

The optional volatile diluent can be comprised in either or both of the components of the kit of parts. Alternatively, it is possible to provide a third reducer component comprising a volatile diluent. Alternatively, if the reducer component is used, either or both of the curing catalyst and the pot life extending agent may be comprised in the reducer component.

The coating composition of the invention can be prepared by mixing the components of the kit of parts.

Application of the coating composition onto a substrate can be via any method known to the skilled person, e.g., via rolling, spraying, brushing, flow coating, dipping, and roller coating. Preferably, a coating composition such as described is applied by spraying.

The coating composition of the present invention can be applied to any substrate. The substrate may be, for example, metal, e.g., iron, steel, and aluminium, plastic, wood, glass, synthetic material, paper, leather, or another coating layer. The other coating layer can be comprised of the coating composition of the current invention or it can be a different coating composition. The coating compositions of the current invention show particular utility as clear coats, base coats, pigmented top coats, primers, and fillers. When the coating composition of the invention is a clear coat, it is preferably applied over a colour and/or effect imparting base coat. In that case, the clear coat forms the top layer of a multi-layer lacquer coating such as typically applied on the exterior of automobiles. The base coat may be a water borne base coat or a solvent borne base coat.

The coating compositions are suitable for coating objects such as bridges, pipelines, industrial plants or buildings, oil and gas installations, or ships. The compositions are particularly suitable for finishing and refinishing automobiles and large transportation vehicles, such as trains, trucks, buses, and airplanes.

The applied coating composition can be cured very effectively at a temperature of, e.g., 0-60° C. If so desired, the coating composition may be oven cured, e.g. at a temperature in the range of 60-120° C. Alternatively, curing may be supported by (near) infrared radiation. Before curing at elevated temperature the applied coating composition may optionally be subjected to a flash-off phase.

It is to be understood that the term coating composition as used herein also includes its use as adhesive composition.

EXAMPLES

Raw materials and abbreviations used:

| | |
|---|---|
| HEMA | Hydroxyethyl methacrylate |
| HEA | Hydroxyethyl acrylate |
| HPMA | Hydroxypropyl methacrylate, mixture of isomers |
| BMA | Butyl methacrylate |
| BA | Butyl acrylate |
| IBMA | Iso-butyl methacrylate |
| TBMA | Tert.-butyl methacrylate |
| MMA | Methyl methacrylate |
| IBOMA | Iso-bornyl methacrylate |
| ST | Styrene |
| MAA/CE10 | The reaction product of methacrylic acid and Cardura E10 |
| MAA | Methacrylic acid |
| TMP | Trimethylol propane |
| HHPA | Hexahydrophthalic anhydride |
| Edenor V85 | A mixture of linear $C_8$ and $C_{10}$ fatty acids ex Cognis |
| Cardura E10 | Glycidylester of versatic acid, ex Hexion Specialty Chemicals |
| CAPA 3031 | A low-molecular weight trifunctional polyol based on TMP and epsilon caprolactone, ex Solvay |
| T-B | Trigonox B, a peroxide based radical initiator ex Akzo Nobel Chemicals |
| T-C | Trigonox C, a peroxide based radical initiator ex Akzo Nobel Chemicals |
| T-42S | Trigonox 42S, a peroxide based radical initiator ex Akzo Nobel Chemicals |
| Tolonate HDL-LV | Isocyanurate trimer of hexamethylene diisocyanate ex Rhodia |
| Desmodur N 3600 | Isocyanurate trimer of hexamethylene diisocyanate ex Bayer |
| Vestanat T1890E | Isocyanurate trimer of isophorone diisocyanate ex Degussa |
| BYK 331 | Silicone additive ex BYK Chemie |
| Tinuvin 1130 | UV absorber ex Ciba Specialty Chemicals |

General Methods:

The solids content of the compositions was determined by measuring the weight loss after heating a sample to 125° C. for 60 minutes.

The molecular weights were determined by size exclusion chromatography using polystyrene as standard.

Preparation of Polyacrylate Polyols

The polymerizations were carried out in an autoclave with heating and cooling means, a stirrer, and a dosing pump. About 50 to 70 weight-% of the total amount of solvent was placed in the autoclave. The solvent was heated to 160° C. and at this temperature a mixture of the monomers in the weight ratio as indicated in Table 1 and 4.6 weight-%, based on the total weight of the monomers, of the polymerization initiator (initiator 1 in Table 1) was added via the dosing pump over a period of 4 hours. The pump and tubing was rinsed with solvent (about 1 to 5 weight-% of the total amount of solvent) and the temperature was lowered to 125° C. A mixture of solvent (about 2 to 10 weight-% of the total amount of solvent) and 0.3 weight-%, based on the weight of the monomers, of additional initiator (initiator 2 in Table 1) were added and the reaction mixture was held at 125° C. for one additional hour. The polymer was diluted with solvent to the final solids content and cooled to room temperature. The solvent was n-butyl acetate, except in comparative Example AA, where a 60:40 mixture of xylene and n-butyl acetate was used.

The acid values and OH values given in Tables 1 and 2 were calculated on the non-volatile content of the respective polymers, i.e. without solvent. The theoretical glass transition temperature (Tg) is indicated in ° C. The solids content is indicated in weight-% of the polymer solution. The average hydroxy functionality of polyols is indicated as f(OH) in Tables 1 and 2. The monomer compositions and properties of the polyacrylate polyols used in the Examples are summarized in Table 1 below.

based on TMP and epsilon caprolactone, was included in Table 2 for the purpose of comparison.

TABLE 2

|  | Example | | | | | |
| --- | --- | --- | --- | --- | --- | --- |
|  | E1 | E2 | EA | EB | EC | CAPA 3031 |
| Building blocks | | | | | | |
| TMP | 44.0 | 48.2 | 39.2 | 35.0 | 40.6 | n.d. |
| HHPA | 17.0 | — | 11.7 | 7.3 | — | — |
| Succinic acid | — | 18.0 | — | — | 4.4 | — |
| Edenor V85 | 39.0 | 33.8 | 49.2 | 57.5 | 55.0 | — |
| Properties | | | | | | |
| Acid value | n.d. | n.d. | 0.9 | 1.1 | n.d. | <1 |
| OH value | 306 | 307 | 270 | 200 | 287 | 561 |
| Mn | n.d. | n.d. | 610 | 500 | n.d. | n.d. |
| Mw | n.d. | n.d. | 770 | 635 | n.d. | n.d. |
| f(OH) | 2.3 | 2.8 | 2.0 | 1.7 | 1.8 | 3 |

"n.d." means "not determined"

TABLE 1

|  | Example | | | | | | | | |
| --- | --- | --- | --- | --- | --- | --- | --- | --- | --- |
|  | A1 | A2 | A3 | A4 | AA | AB | AC | AD | AE |
| Monomers | | | | | | | | | |
| HEMA | 32.6 | 32.6 | — | 32.6 | — | 32.6 | 24.8 | 32.6 | 32.6 |
| HEA | — | — | 16.8 | — | — | — | — | — | — |
| HPMA | — | — | — | — | 38.0 | — | — | — | — |
| BMA | 19.0 | 21.9 | 49.6 | 23.1 | 9.0 | 17.0 | — | 15.9 | 10.5 |
| TBMA | 27.3 | 44.4 | — | — | — | — | — | — | — |
| IBMA | — | — | — | — | 16.0 | — | — | — | — |
| BA | — | — | 17.2 | 35.2 | — | — | — | — | — |
| MMA | — | — | — | 2.7 | 15.0 | 4.3 | 34.1 | 30.4 | 35.9 |
| IBOMA | — | — | — | — | — | 25.0 | — | — | — |
| MAA | 1.1 | 1.1 | 1.1 | 1.4 | 1.0 | 1.1 | 1.1 | 1.1 | 1.1 |
| ST | 20.0 | — | 15.3 | 5.0 | 20.0 | 20.0 | 20.0 | 20.0 | 20.0 |
| MAA/CE10 | — | — | — | — | — | — | 20.0 | — | — |
| Initiator 1 | T-B | T-B | T-42S | T-42S | * | T-B | T-B | T-B | T-C |
| Initiator 2 | T-B | T-B | T-B | T-B | * | T-B | T-B | T-B | T-B |
| Properties | | | | | | | | | |
| Acid value | 15 | 16 | 14 | 12 | 6 | 13 | 14 | 12 | 12 |
| OH value | 140 | 140 | 81 | 140 | 150 | 140 | 140 | 140 | 140 |
| Mn | 1125 | 2090 | 2665 | 2345 | 3180 | 1160 | 1315 | 1530 | 1690 |
| Mw | 2580 | 4470 | 6275 | 5260 | 8210 | 2295 | 2825 | 3225 | 3660 |
| f(OH) | 2.8 | 4.2 | 3.8 | 5.8 | 8.5 | 2.9 | 3.3 | 3.8 | 4.2 |
| Tg | 72 | 72 | 7 | 3 | 75 | 72 | 72 | 72 | 77 |
| Solids | 57 | 67 | 71 | 72 | 55 | 58 | 58 | 58 | 74 |

* sample AA is from an external supplier, the type of initiator is not known

Preparation of Polyester Polyols

In a reaction vessel equipped with a stirrer, a heating system, a thermocouple, a packed column, a condensor, and a water separator the polyester building blocks were heated in the weight proportions listed in Table 2. Furthermore, an amount of 1 weight-%, calculated on the building blocks, of 85 weight-% aqueous phosphoric acid was added as catalyst. Under inert gas the temperature was increased gradually to 240° C. The reaction water was distilled off at such a rate that the temperature at the top of the column did not exceed 102° C. The reaction was conducted till the parameters listed in Table 2 were reached. The properties of the obtained solvent-free polyester polyols are presented in Table 2. The commercial low molecular weight trifunctional polyol CAPA 3031, Preparation of Coating Compositions A first series of clear coat compositions was prepared by mixing the components in the weight proportions indicated in Table 3. The molar ratio of hydroxy groups to isocyanate groups was 1:1 in all cases. In addition to the components mentioned in Table 3, all clear coat compositions contained the following additives:

1.5 parts by weight of benzoic acid, 0.021 to 0.030 parts by weight of dibutyl tin dilaurate, 0.1 part by weight of BYK 331, 1 part by weight of hindered amine light stabilizer, and 0.6 parts by weight of Tinuvin 1130.

The amount of additives was calculated on the total resin solids of the composition.

TABLE 3

| | Example | | | | | | | | |
|---|---|---|---|---|---|---|---|---|---|
| | 1 | 2 | 3 | C1 | C2 | C3 | C4 | C5 | C6 |
| Polyacrylate polyol | A3 | A4 | A4 | A1 | AA | AB | AC | AD | AE |
| | 40 | 44 | 36.2 | 69 | 24 | 55 | 44 | 39 | 20 |
| Polyester E1 | 23 | 16 | 18.7 | 0 | 32 | 10 | 18 | 22 | 33 |
| Desmodur 3600 | 23.4 | 25.3 | 24.8 | 31 | 44 | 35 | 38 | 39 | 29.7 |
| VestanatT1890E | 13.6 | 14.7 | 20.3 | — | — | — | — | — | 17.3 |
| Butyl acetate | 71.5 | 71.0 | 12.3 | 84.0 | 84.2 | 82.8 | 82.1 | 82.4 | 71.5 |
| MIAK | 2 | 2 | — | 2 | 2 | 2 | 2 | 2 | 2 |
| Exempt solvents[1] | — | — | 63.2 | — | — | — | — | — | — |
| VOC (g/l) | 420 | 420 | 419 | 420 | 420 | 420 | 420 | 420 | 420 |
| VOC (g/l) exempt[2] | | | 234 | | | | | | |
| Viscosity (DIN cup, s) | 16 | 16 | 16 | 16 | 16 | 16 | 16 | 16 | 16 |

[1]Exempt solvents are solvents which are not taken into account for the calculation of the VOC content under United States legislation. The exempt solvent of Example 3 consisted of a mixture of 14.4 g 2-ethylhexyl acetate, 13.7 g 2-methoxypropyl acetate, 16.1 g parachlorobenzotrifluoride, and 18.1 g acetone.
[2]The VOC value for Example 3 was additionally calculated without taking the exempt solvents into account as volatile organic compounds.

The clear coat compositions were spray applied by a coating robot on metal panels which were pre-coated with a base coat layer. The clear coats were applied with a layer thickness gradient. After a flash-off period the samples were dried for 55 minutes in an oven at 60° C. and subsequently allowed to fully cure at room temperature. After cure the number of pinholes was counted in an area of 4 cm$^2$ at a clear coat layer thickness of 80 µm. Enamel hold out (EHO) was determined visually in order to judge the general appearance. The following aspects were taken into consideration: gloss, wrinkling, flow, and image clarity/distinctness of image. These aspects were combined into one score on a 1-10 scale (1=very bad appearance, 10=excellent appearance).

TABLE 4

| | with properties of coatings | | | | | | | | |
|---|---|---|---|---|---|---|---|---|---|
| | Example | | | | | | | | |
| | 1 | 2 | 3 | C1 | C2 | C3 | C4 | C5 | C6 |
| Pinholes | 0 | 7 | 0 | 28 | 42 | 42 | 50 | 28 | 19 |
| EHO | 6.5 | 7 | 6 | 6.5 | 6 | 6 | 6.5 | 6 | 6.5 |

The first series of Examples 1 to 3 according to the invention and Comparative Examples C1 to C6 demonstrate the influence of the monomer composition of the polyacrylate polyol. All Comparative Example samples wherein the polyacrylate polyol comprises less than 40 weight-% of monomers comprising linear or branched alk(en)yl or alk(en)ylene groups having at least 4 carbon atoms lead to coatings having an unacceptably high number of pinholes. Examples 1 to 3 according to the invention exhibit a significantly lower amount of pinholes, if any at all. The other properties of the clear coats were on a similar level. Example 3 demonstrates that the effect of the invention is also present when so-called exempt solvents are used.

A second series of clear coat compositions was prepared by mixing the components in the weight proportions indicated in Table 5. The molar ratio of hydroxy groups to isocyanate groups was 1:1 in all cases. The VOC was 420 g/l in all cases. In addition to the components mentioned in Table 5, all clear coat compositions contained the following additives:

1.5 parts by weight of benzoic acid,
0.035 parts by weight of dibutyl tin dilaurate,
0.1 part by weight of BYK 331,
1 part by weight of hindered amine light stabilizer, and
0.6 parts by weight of Tinuvin 1130.

The amount of additives was calculated on the total resin solids of the composition.

TABLE 5

| | Example | | | | | |
|---|---|---|---|---|---|---|
| | 4 | 5 | C7 | C8 | C9 | C10 |
| Polyacrylate polyol A2 | 45.0 | 44.0 | 43.8 | 41.8 | 44.4 | 49.7 |
| Polyester polyol | E1 | E2 | EA | EB | EC | CAPA 3031 |
| | 20.6 | 20.6 | 22.8 | 26.4 | 21.7 | 12.4 |
| Tolonate HDT-LV | 34.4 | 34.4 | 33.4 | 31.9 | 33.9 | 37.9 |
| Additional solvent | 34.4 | 34.4 | 34.1 | 33.9 | 34.1 | 34.5 |
| Viscosity (DIN cup, s) | 16.6 | 16.1 | 14.9 | 14.1 | 14.5 | 15.6 |

The clear coat compositions of Table 5 were applied and dried as described above. For determination of the sag length the panels were provided with punch holes. The clear coat sag length beneath a punch hole at 80 µm layer thickness of a vertically dried panel was measured. The Persoz hardness of the samples was determined 2 hours after curing, after 1 day, and after 3 days. The results are indicated in seconds. The warm tackiness was determined manually by pressing a finger on the warm coating surface after curing at 60° C. The results are reported on a scale from 1 to 10 (1=very tacky, 10=not tacky).

TABLE 6

| | with properties of coatings | | | | | |
|---|---|---|---|---|---|---|
| | Example | | | | | |
| | 4 | 5 | C7 | C8 | C9 | C10 |
| Pinholes | 2 | 4 | 2 | 1 | 0 | 27 |
| Persoz (2 h) | 38 | 29 | 26 | 25 | 23 | 37 |
| Persoz (1 day) | 73 | 57 | 57 | 52 | 51 | 70 |

TABLE 6-continued with properties of coatings

| | Example | | | | | |
|---|---|---|---|---|---|---|
| | 4 | 5 | C7 | C8 | C9 | C10 |
| Persoz (3 days) | 73 | 56 | 57 | 51 | 51 | 69 |
| Warm tackiness | 7 | 7 | 6 | 5 | 6 | 8 |
| Sagging | 33 | 11 | 11 | 75 | 24 | 11 |

The second series of Examples 4 and 5 according to the invention and Comparative Examples C7 to C10 demonstrate the influence of the building blocks and properties of the polyester polyol. Examples 4 and 5 according to the invention exhibit good properties overall. In Comparative Example C7 a polyester polyol with a hydroxy value of only 270 mg KOH/g, i.e. slightly below the value required according to the invention, was used. This results in an unacceptably low initial Persoz hardness and a tacky surface after initial curing. These disadvantages are even more pronounced in Comparative Example C8, where a polyester polyol having an even lower hydroxy value and a hydroxy functionality below 2 is used. Furthermore, the sagging tendency of Comparative Example C8 is unacceptable. Also when the hydroxy value is above 280 mg KOH/g, but the functionality of the polyester polyol is below 2, such as in Comparative Example C9, the initial and the final Persoz hardness are too low. When a polyester polyol is used which does not fulfill the requirement of at least 30 weight-% of building blocks having linear or branched alk(en)yl or alk(en)ylene groups with at least 4 carbon atoms per ester-forming functional group, the formation of pinholes is on an unacceptable level. This can be inferred from Comparative Example C10.

The invention claimed is:

1. A coating composition comprising
    a) a polyacrylate polyol obtained by polymerization of olefinically unsaturated monomers wherein at least 40 weight-% of the monomers comprises linear or branched alk(en)yl or alk(en)ylene groups having at least 4 carbon atoms, wherein the number average molecular weight (Mn) of the polyacrylate polyol does not exceed 5,000, and the polydispersity (Mw/Mn) is below 2.8;
    b) a polyester polyol obtained by esterification of building blocks having ester-forming functional groups wherein at least 30 weight-% of the building blocks comprises linear or branched alk(en)yl or alk(en)ylene groups with at least 4 carbon atoms per ester-forming functional group, the polyester polyol having a hydroxy value above 280 mg KOH/g and a hydroxy functionality of at least 2,
    c) an isocyanate-functional crosslinker, and
    d) a volatile organic diluent, wherein at least 60 weight-% of the volatile organic diluent comprises alk(en)yl or alk(en)ylene groups having at least 4 carbon atoms,
    wherein the non-volatile content of the coating composition is higher than 50 weight-% based on the total composition.

2. The coating composition according to claim 1, wherein the composition is a clear coat composition.

3. The coating composition according to claim 1, further comprising a curing catalyst.

4. The coating composition according to claim 3, wherein the curing catalyst is a metal based curing catalyst.

5. The coating composition according to claim 3, further comprising at least one pot life extending agent.

6. The coating composition according to claim 5, wherein the pot life extending agent is selected from carboxylic acids, thiol-functional compounds, or mixtures thereof.

7. A kit of parts for preparation of a coating composition having a non-volatile content which is higher than 50 weight-% based on the total composition, comprising
    (i) a binder component comprising a polyacrylate polyol obtained by polymerization of olefinically unsaturated monomers wherein at least 40 weight-% of the monomers comprises linear or branched alk(en)yl or alk(en)ylene groups having at least 4 carbon atoms wherein the number average molecular weight (Mn) of the polyacrylate polyol does not exceed 5,000, and the polydispersity (Mw/Mn) is below 2.8, and a polyester polyol obtained by esterification of building blocks having ester-forming functional groups wherein at least 30 weight-% of the building blocks comprises linear or branched alk(en)yl or alk(en)ylene groups with at least 4 carbon atoms per ester-forming functional group, the polyester polyol having a hydroxy value above 280 mg KOH/g and a hydroxy functionality of at least 2,
    (ii) a crosslinker component comprising an isocyanate-functional crosslinker, and
    (iii) a reducer component comprising a volatile organic diluent wherein at least 60 weight-% of the volatile organic diluent comprises alk(en)yl or alk(en)ylene groups having at least 4 carbon atoms.

8. The kit of parts according to claim 7, wherein the binder component additionally comprises a curing catalyst.

9. The kit of parts according to claim 7, wherein the binder component additionally comprises a pot life extending agent.

10. The kit of parts according to claim 7, wherein the reducer component additionally comprises a curing catalyst and a pot life extending agent.

11. A method of applying a coating composition to a substrate, the method comprising applying the coating composition according to claim 1 to the substrate.

12. The method according to claim 11, wherein the coating composition is applied as a top coat in a multi-layer lacquer coating.

13. The method according to claim 11, wherein the substrate is a car or a large transportation vehicle.

14. The method according to claim 13, wherein the applied coating composition serves to finish or refinish the car or large transportation vehicle.

15. The coating composition according to claim 2, wherein the composition additionally comprises a curing catalyst.

16. The coating composition according to claim 15, wherein the curing catalyst is a metal based curing catalyst.

17. The kit of parts according to claim 8, wherein the binder component additionally comprises a pot life extending agent.

18. A method of applying a coating composition to a substrate, the method comprising applying the coating composition according to claim 6 to the substrate.

19. The method according to claim 18, wherein the substrate is a car or a large transportation vehicle.

* * * * *